United States Patent

De Haeck

[15] 3,662,144
[45] May 9, 1972

[54] APPARATUS FOR BACKING WORKPIECES FOR WELDING

[72] Inventor: Robert Jean De Haeck, Uccle, Brussels, Belgium

[73] Assignee: La Soudure Electrique Autogene, Procedes Arcos, Anderlecht, Belgium

[22] Filed: June 30, 1969

[21] Appl. No.: 837,771

Related U.S. Application Data

[62] Division of Ser. No. 612,864, Jan. 31, 1967, Pat. No. 3,511,960.

[30] Foreign Application Priority Data

Feb. 11, 1966  Belgium .......................................23971
Sept. 8, 1966  Belgium .......................................33086
Dec. 16, 1966  Belgium .......................................37319

[52] U.S. Cl..............................219/73, 219/137, 219/160
[51] Int. Cl.........................................................B23k 9/18
[58] Field of Search..................219/73, 160, 137; 29/491

[56] References Cited

UNITED STATES PATENTS

| | | | |
|---|---|---|---|
| 3,307,014 | 2/1967 | Bada et al. | 219/73 |
| 3,221,135 | 11/1965 | Maier, Jr. | 219/137 |
| 2,331,937 | 10/1943 | Schreiner | 219/73 |
| 3,420,979 | 1/1969 | Gowan | 219/73 |

Primary Examiner—J. V. Truhe
Assistant Examiner—George A. Montanye
Attorney—Jackson, Jackson and Chovanes

[57] ABSTRACT

The invention relates to an apparatus for electric arc welding of two spaced plates forming a horizontal weld groove. The apparatus comprises a U-shaped trough which is beneath the weld groove, which extends from one plate to another and which contains a granular refractory material in position to contact the plates along the welding groove, elastic and compressible cushions being interposed between the said granular material and respectively both lateral arms of the U-shaped trough and contacting elastically both plates along these arms, another elastic and compressible cushion being further interposed and elastically compressed between the said granular material and the base of the said U-shaped trough.

5 Claims, 6 Drawing Figures

INVENTOR
Robert Jean DeHaeck
BY
ATTORNEYS

INVENTOR
Robert Jean De Haeck
BY
Jackson, Jackson and Chovan
ATTORNEYS

APPARATUS FOR BACKING WORKPIECES FOR WELDING

This application is a division of application Ser. No. 612,864, filed Jan. 31, 1967 for Electric Arc Welding now U.S. Pat. No. 3,511,960, granted May 12, 1970.

This application relates to an electric arc welding of joints between metallic plates, one of which at least, is laid down.

Plates used in ship building are delivered directly from the steel mills. Their edges are irregular, with jagged seams or covered with oxides. To weld them correctly requires observance of a list of prior conditions. First the edges must become perfectly straight. They are therefore cut correctly before being abutted. Knowing the number of plates needed to be welded to make a ship, and that each plate must be cut on four sides, one can get an idea of the amount of waste resulting from trimming. But there is more: the edges of the plates must be set to avoid any offset between them. They must be level to each other. This requires preliminary positioning which takes a long time.

The complication is still worsened by the fact that when weld metal has been deposited on one side of the joint, the plates must be turned over to deposit weld metal on the reverse side of the joint. This operation is time consuming, difficult and costly because of loss of time. Furthermore it requires capital investment in machinery such as cranes and other material handling equipment and also suitable buildings. Due to the great dimensions of the plates being welded — and this is particularly true for ship plates — the sizes of the workshops become insufficient.

It becomes clear from these facts how advantageous it would be in shipbuilding, to select a welding process which would eliminate all these difficulties. A desirable feature would be to weld the plates without having first to set their edges, and also to weld the plates on one face only.

In addition to the preceding, the following considerations must be taken into account:

In the technique of shipbuilding, the plate thickness and the weld deposition rate are essential factors. This will explain how important it will be to use any welding process using higher and higher currents to increase the deposition rate. Precisely because of the great energy developed in the arc of well-known automatic or semi-automatic processes of submerged arc welding, or with flux-cored wires, the latter processes are much in demand in shipbuilding.

When the current increases, the power developed in the arc becomes enormous, and this means also deep penetration in the base metal. To obtain practical success in an automatic welding process of this kind, two groups of factors must be properly determined: the welding parameters which a workman of average intelligence can select, and the preparation and setting of the edges.

It is easy to obtain under laboratory conditions a perfect joint by the submerged arc welding process in plates ¼, ⅜, ¾ and 1 ¼ inches thick and more, which have been prepared with I, Y or X edges, using the parameters found in most welding handbooks. The plates are placed very closely side by side, with some tolerance of the gap between them. Certainly, when the plates have been well sheared, the high current welding process is satisfactory. But when gaps between edges to be welded reach five thirty-seconds inch, the arc and the weld pool may pass through. It is in such case that human control becomes essential because the operator using a manual electrode of the heavy deposition type will immediately adjust his parameters to suit the variations of spacing between the edges. It is for that reason that the preparations mentioned hereabove are often replaced by an incomplete V chamfer with narrow straight faces at the bottom. One or more passes are hand welded at the bottom of the chamfer. The joint is then completed with more layers deposited in succession on one side and the other of these first manually welded passes.

In final analysis, the use of a high speed and fully automatic welding process is limited by the practical difficulty of correct pre-assembling which would be compatible with the welding parameters selected in the laboratory in close relationship to the gap between the edges.

If, however, in spite of these difficulties, high current automatic welding processes must be used, an improvement can be obtained by increasing the number of passes and reducing the current in the first pass. However, there will still be differences in penetration which no longer can be corrected by the operator because in such case observation and control of the weld pool are missing and therefore the joints will be of variable quality from the standpoint of interpenetration. Furthermore, the cost of the welding operation will be increased.

To remedy the difficulties of the above-mentioned processes, a cooled or an uncooled metallic back strip, or a refractory one, have been proposed, such back strip being either powdery or compact. In some cases both forms have been combined. However, such methods are not used practically for the following reasons: a thick copper strip such as proposed in Robbins U.S. Pat. No. 3,253,121 to prevent leakage of molten metal from the pool is objectionable because of its tendency to cool the weld metal, creating harmful residual stresses in the structure. Furthermore, if the plates being welded are not perfectly plane, and this is often the case in practice, it is extremely difficult to hold the metallic back strip sufficiently close to the surface of the plates to prevent leakage of weld metal between the backstrip and the rear face of the plates being welded. In such case, a spacing between the strip and the plate of 0.020 inch is the permissible maximum.

Even if it were possible, with considerable care, to reduce greatly the tolerance of level inequality between the plates, variations in the gap between the plates which are unavoidable in modern methods of cutting, would still exist. The defects caused by such differences in the gap width are the following:

In the high speed welding process, the welding parameters are related to high currents. The electric power in the arc is great. When the edges are sufficiently close together, this high energy of the arc can be distributed correctly and deeper portions in the joint also become fused, giving a smooth joint on the rear face, but in so doing the penetration effect of the arc extends toward the rear copper backing strip due to the very power of the arc. If the edges of the plates are somewhat wider apart, the penetration effect of the arc results in a local fusion of the copper strip, rapidly followed by a local cooling, resulting in a heavy contamination of the rear face of the weld. The harmful effect of copper in steel, from he backing strip, is well-known in welding practice from the cracking it causes in the joint. On the other hand if the distance between the edges of the plates is too small, the deeper portions of the joint will be incompletely fused.

It is therefore clear that the setting of the edges at the correct distance from each other is a delicate operation which is akin to precision work with all the consequences it entails in technique, where such requirement becomes a grave drawback.

The harmful effect of the copper can be eliminated by using granular refractory supporting materials. Such solution has been proposed already by investigators.

Instead of the copper strip covering the rear face of the joint, some trough, for instance, filled with a free-moving granular refractory material bridges the rear face of the joint. In most variations of this concept, the refractory powder is subjected to some pressure against the rear face of the parts being welded, in order, allegedly, to give the rear face of the weld a suitable profile. In one of the variants, in particular, a pneumatic sleeve or tire is placed in the bottom of the trough and a free metallic strip is located between the sleeve and the powder filling the trough, to distribute the pressure of the refractory material.

In patent application Ser. No 612,864, now U.S. Pat. No. 3,511,960 as indicated, of which the present application is a division, there is described a new granular refractory material allowing a welded joint of good quality without the necessity of applying the refractory powder against the plates with a high pressure. This granular refractory material is applied against the rear face of the plates, for example by a trough bridging the groove between the said plates.

However, in case the plates to be welded are not perfectly plane, it becomes more difficult to pack the refractory powder moderately tight with pressure against the plates suitable to produce a weld bead showing a satisfactory reinforcement, because the powder leaks out through the gaps between trough and plates. In the case where good pressure before welding has nevertheless been obtained, it can happen that during welding the said gaps will shrink because of distortion of the plates and/or the trough and that the pressure of the powder against the plates will become greater than that which would result in a good-looking reinforcement. It has been found that, in such cases, undercutting sometimes appears in the plate or the reinforcement changes into a groove.

If, on the contrary, the plates and/or the trough are distorted with the effect of increasing locally the spacing between trough and plates, then the refractory powder which was initially packed tight at the suitable pressure against the plates ceases to keep contact with the latter or with one of the plates. It could then happen that the weld pool will flow out laterally and that the reinforcement will take an irregular and poor-looking shape. Furthermore, it has sometimes been found that such a reinforcement may be imperfectly welded to the plate.

With a view to remedy these difficulties, the applicant has proposed to apply the said refractory powder elastically against the plates to be welded. For this purpose, he has proposed a apparatus comprising an U-shaped trough which is beneath the weld groove, which extends from one plate to another and which contains a granular refractory material in position to contact the plates along the welding groove. In this apparatus, elastic and compressible cushions are interposed between the said granular material and respectively both lateral arms of the U-shaped trough and contact elastically both plates along these arms. Another elastic and compressible cushion is further interposed and elastically compressed between the said granular material and the base of the said U-shaped trough.

Thanks to these elastic and compressible cushions, a harmful over-pressure can easily be avoided during the packing of the powder at the time of filling the trough, should the amount of powder introduced in the trough be a little greater than what is needed to obtain a nice reinforcement. If, during welding, the gap between the trough and the plates being welded should increase, the elasticity of the compressible cushion would tend to expand the latter to the initial volume it occupied before filling, and therefore the powder remains tight against the plates. If, on the contrary, the gap between the trough and the plates being welded should be reduced during welding, the resulting over-pressure of the refractory powder against the plates will remain moderate because the cushion can easily be further compressed.

It has already been proposed to maintain a layer of refractory granules elastically tight against the plates being welded, by means of a pneumatic sleeve set between the bottom of the trough and a free metallic strip supporting the granules. This method is costly due to the equipment it requires. Moreover, it is very bulky because the layer of granules must be thick in order to protect the sleeve against heat. Furthermore, it is sometimes difficult to use because openings needed to pass the sleeve must be provided through the stiffeners already welded on the plates. Finally, it may happen that pneumatic pressure will force granules between the plates, especially in locations where the plates are far apart due to careless preparation.

The elasticity of the cushions of the apparatus according to the invention, which are elastically applied against both plates to be welded, ensures a good tightness between these cushions and plates, even when the latter are not perfectly plane. Thus, the portions of these cushions, which contact the plates to be welded, prevent any leakage of the refractory powder and contribute to obtain a satisfactory welded joint.

In the apparatus according to the invention, the elastic cushions consist advantageously of cotton-like felts made of fine fibers resulting from the fusion of a mixture consisting essentially of alumina and silica with a higher content of alumina than of silica.

The granular refractory material used with the apparatus of the invention consists advantageously in a mixture of:

a. 43 to 63% of an ingredient comprising 50 to 60% of $SiO_2$, 25 to 35% of $CaO$, 2 to 4% of $MgO$, 2 to 4% of $Al_2O_3$, 1 to 2% of $FeO$, 0.5 to 2% of $Na_2O$, 0.5 to 2% of $K_2O$, 1 to 2% of $CaF_2$;

b. 35 to 50% of an ingredient comprising 30 to 40% of $SiO_2$, 55 to 65% of $Al_2O_3$ and 5 to 10% of various oxides such as $CaO$, $MgO$, $Fe_2O_3$, $TiO_2$, $Na_2O$, $K_2O$;

c) 1 to 3% of cryolite;

d) 1 to 4% of a deoxidizer.

The deoxidizers which can be used are, preferably, strong deoxidizers such as aluminum, silicon, magnesium, calcium and titanium. Some of these deoxidizers may be used in metallic form, others being usable only in a combined form. Silicon can be used with advantage.

The invention will now be more fully described with reference to the annexed drawings which represent, as an example, some embodiments of the apparatus according to the invention.

In these figures, like references pertain to like means or parts of means used.

Figure 1:
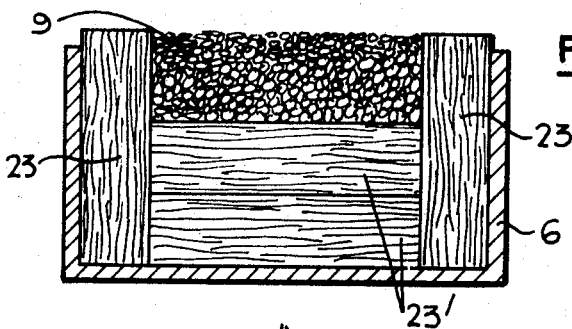
FIG. 1 is a cross section in a U-shaped trough ready to be pressed against horizontal plates to be welded.

In FIG. 1, there is shown a U-shaped trough 6 wherein elastic and compressible cushions are laid parallel to both flanges or arms of the U and to the web or base of the same. Said cushions consist in fine fibers of ceramic material compacted to make a cotton-like felt. These fibers are advantageously obtained from a molten mass consisting essentially in alumina and silica, with a higher proportion of alumina than of silica. Fibers having the chemical composition of 51.2% of $Al_2O_3$, 47.4% of $SiO_2$, 0.7% of $B_2O_3$ and 0.7% of $Na_2O$ are perfectly suitable to realize the invention. These fibers are obtained, for instance, by blowing high speed gases on a molten mass having the aforesaid composition and heated to a temperature higher than its melting point which is 1,760° C. Fibers obtained by this process have a diameter between 2 and 10 microns, their average size being 2.5 microns. They can resist a permanent temperature of 1,260° C.

They can also be used at higher temperatures of shorter periods of time.

The cushions parallel to the flanges or arms of the trough are designated 23. They are arranged with their long faces parallel to the flanges or arms. Upon the web or base of the trough, two cushions designated 23' have been laid with their long faces parallel to the web or base. These cushions 23' are set between the cushions 23 to assist holding the latter against the flanges.

Figure 2:
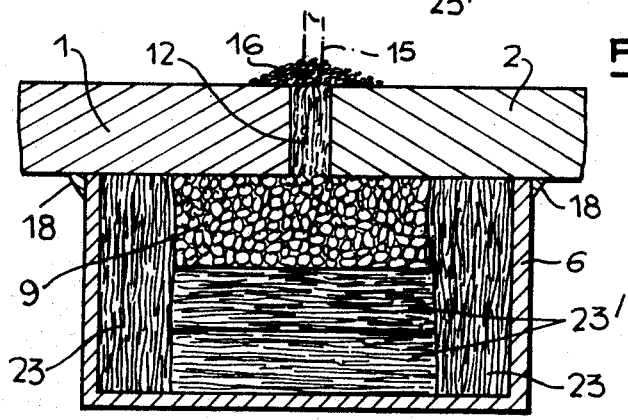
FIG. 2 is a section across the trough of FIG. 1 after pressing it along a joint between two horizontal plates to be welded by the submerged arc process, the joint being filled with predominently metallic powders plus a layer of welding flux over the joint.

The cushions 23 have a height such as to exceed by a few millimeters the upper level of the edges of the flanges of the trough. The space above the cushions 23' and between the cushions 23 is filled completely with refractory powder. In FIG. 2, the trough filled in this manner is pressed against the lower face of horizontal plates being welded, such as designated by 1 and 2 in FIG. 2. The trough is held in such position by a few weld tacks such as 18. In this setting, the cushions 23 are lightly compressed by their direct contact with the plates, while cushions 23' are compressed lightly by the pressure they receive from the refractory powder 9. Since these cushions are very compressible, the pressure to which this powder is subjected from the reaction of the cushions remains moderate. Furthermore, due to the great elasticity of said cushions, should the trough separate from the plates during welding, the powder would remain in elastic contact with the plates with unchanged pressure. Finally, because the cushions 23 exceed the level of the upper edges of the flanges of the trough, they contribute to prevent leakage of the powder through a gap which could exist between the plates and the flanges or arms of the trough if these cushions were not initially higher than these flanges or arms.

In FIG. 2, a predominately metallic powder 12 is shown in the joint between the plates being welded. The joint is covered with a layer of welding flux 16 intended to permit welding by the submerged arc process with a fusible electrode such as 15 shown in interrupted lines. By the process of the invention, the fusion of said powder in the joint permits welding the plates with access to one face only, even when the edges of the plates facing each other across the joint have not been carefully set. The refractory powder 9 held in position against the lower face of the plates prevents piercing the joint even when the distance between said edges reaches several millimeters. This powder protects the cushions 23 and 23' at the same time against the heat generated by the weld pool during welding. They can thus be used many times before being replaced.

Figure 3:
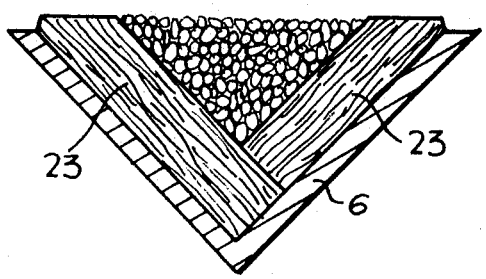
FIG. 3 is a cross-section similar to that of FIG. 1 in the case of the trough is V-shaped, ready to be pressed against the horizontal plates being welded.

In FIG. 3, another trough is shown ready to be pressed against the plates being welded. This other trough is shaped as a V. On both flanges, elastic and compressible cushions such as 23 have been laid reaching beyond the upper edges of the flanges, upward.

Figure 4:
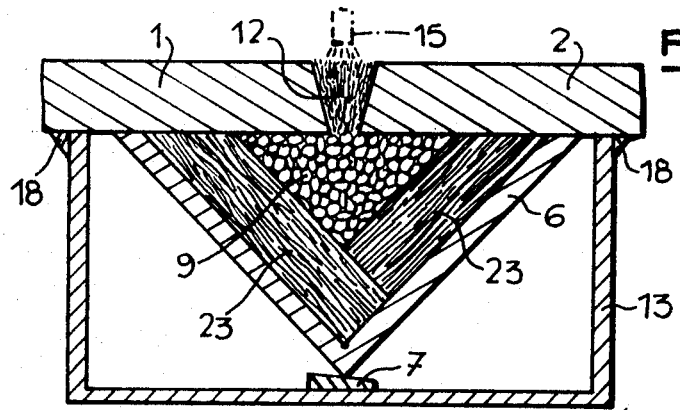
FIG. 4 is a section across the trough of FIG. 3 after pressing it along a joint between two horizontal plates being welded by the visible arc process under gas protection, the joint being filled with predominantly metallic powders.

In FIG. 4, said trough is shown being held against the lower face of the plates 1 and 2 by means of wedges 7 engaged between them and U-shaped braces 13 attached to the plates by a few weld tacks 18 to be removed later. The edges of said plates have been lightly chamfered even though such chamfering is not required, as shown in FIG. 4. The welding process shown in FIG. 4, is the visible arc process with gas protection. Processes of automatic welding other than those shown in FIGS. 2 and 4 can of course also be used.

The refractory powder 9 used together with the elastic and compressible cushions as described in FIGS. 1 to 4, may have one of the compositions described in application Ser. No. 612,864, now U.S. Pat. No. 3,511,960, of which the present application is a division. For example, this powder may contain 50 to 60% of $SiO_2$, 25 to 35% of CaO, 2 to 4% of MgO, 2 to 4% of $Al_2O_3$, 1 to 2% of FeO, 0.5 to 2% of $Na_2O$, 0.5 to 2% of $K_2O$, 1 to 2% of $CaF_2$.

Experience has shown that there is interest of using as a refractory powder a mixture consisting of:
a. 43 to 63% of powder having the above mentioned composition;
b. 35 to 50% of an ingredient comprising 30 to 40% of $SiO_2$, 55 to 65% of $Al_2O_3$ and 5 to 10% of various oxides such as CaO, MgO, $Fe_2O_3$, $TiO_2$, $Na_2O$, $K_2O$;
c. 1 to 3% of cryolite;
d. 1 to 4% of a deoxidizer.

Strong deoxidizers are preferably used, such as aluminum, silicon, magnesium, calcium, titanium, some of which are usable only in combined form, as in alloys.

Within the limitations mentioned above, the refractory powder may advantageously consist of a mixture of 55 percent of the powder as per a) above, with 40 percent of the product as per b) above, plus 2 percent of cryolite and 3 percent of silicon.

In shipyards, when the metal plates for shipbuilding can be assembled in nearby assembly halls prior to being fitted on the ship, the arrangement in which the support at the back of the joint has been made elastic is preferably used for welding these plates.

Figure 5:
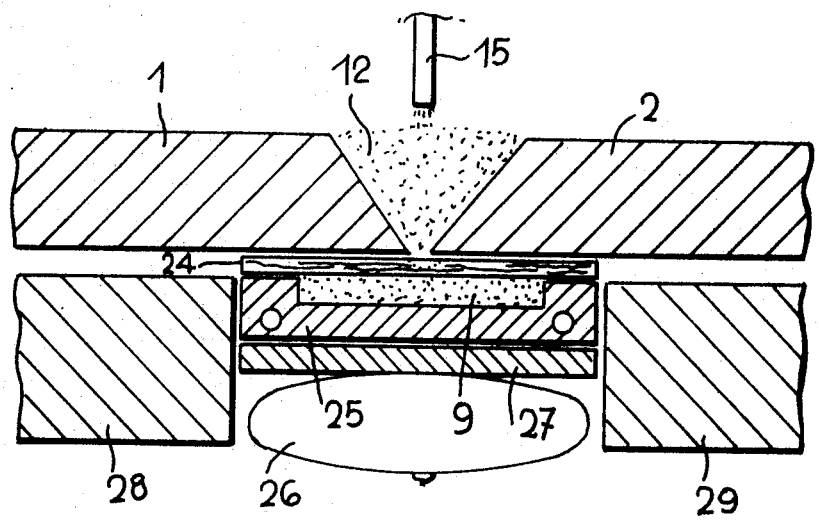
FIG. 5 is a section across the joint to be welded and the device acting as a support which is a variant on the methods of applying the device acting as a support described by the preceding figures.

The device whereby the support is made elastic is rather cumbersome, however, and efforts are under way to make it as easy to handle as possible. Among the methods applied to make the device easier to handle is one which consists of reducing the quantity of refractory granules in the trough placed at the back of the joint, but since this granule layer cannot be reduced without unfavorably affecting the quality of the weld bead, an attempt was made to counterbalance the quantity of granules withdrawn by interposing a thin strip of braided non-metal fiber between the back of the joint and the trough. (FIG. 5).

During the welding operation the melting of the predominantly metal powder in that part of the joint which is in contact with the fiber strip causes the latter to melt on the side opposite it, producing a groove. Through the flexibility of the strip of braided non-metal fiber, combined with the elastic effect of the support which enables it to adapt perfectly to irregularities on the surfaces of the plates with which it is in contact, this groove has the great advantage of being perfectly straight and of strictly regular length and depth, for that part of the molten metal which is in contact with the groove moulds itself on the latter and keeps after cooling the shape it thus obtains.

Moreover, when the strip is pierced right through, the surface layer of the underlying powder in contact with the strip becomes sintered and maintains a bottom for the groove.

It is clear, of course, that excessive current levels would cause excessive melting of the braided strip and part of the underlying powder with it, which would have the drawback of wiping out the advantage of using the strip.

The same would apply if the strip were not thick enough. For this reason, limiting current and tape thickness values were determined for various plate thicknesses; within these limits the said results can be obtained.

These values are shown in the table below.

| Plate thickness in mm. | Current in Amps. | Tape thickness in mm. |
|---|---|---|
| 8 | 550–650 | 1.5 to 3 |
| 15 | 770–800 | 1.5 to 3 |
| 20 | 850–950 | 3 to 6 |
| 25 | 1000–1100 | 3 to 6 |
| 30 | 1250–1350 | 3 to 6 |

From this table it can be seen that the strip thickness is a direct function of the current applied, which in turn, of course, is a function of the thickness of the plates to be welded.

A further advantage of this arrangement is that an ordinary refractory material is used as the powder underlying the strip.

As regards the nature of the braided non-metal fiber forming the strip, several types of fiber were used and it was found that silico-aluminous type fiber, whose melting point is around that of the metal, was very well suited to the formation of this groove in the strip during welding. For instance, a fiber which gave especial satisfaction was sillimanite fiber.

The apparatus shown in FIG. 5 comprises a strip 24 of braided non-metal fiber, disposed beneath the groove between both plates 1 and 2 to be welded, which is filled with a predominantly metal powder 12. This strip 24 rests on a bed of refractory granules 9 contained in a trough 25. This trough in turn rests on a pneumatic tube or tire 26 of elastomeric material so that the part of the device acting as a support for the braided strip exerts an elastic effect from a support not shown and thus provides the strip with the greatest possible adaptability at the back of the joint to be welded while exerting constant pressure all over.

It may possibly be advantageous to place a thickness of asbestos 27 between the trough 25 and the tire 26, to increase the flexibility of the device even more. The unit is held in place from the side by rigid flanks 28 and 29.

The braided strip is about 3 mm thick, and the bed of refractory granules is also about 3 mm thick.

Figure 6:
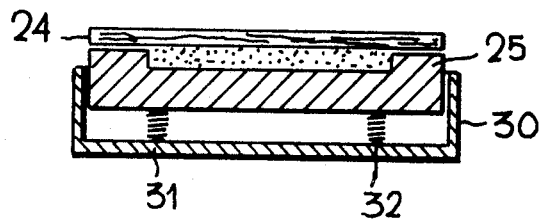
FIG. 6 is a cross-section of a sub-variant on the method of applying the device described by FIG. 5.

In the application shown in FIG. 6, trough 25 enters telescopically between the vertical inside walls of casing 30 and rests quite simply on a pair or a double horizontal line of suitable spiral compression springs 31 and 32, or on a pneumatic tire (not shown) placed between the outer surface of the bottom of the trough and the inner surface of the bottom of the casing 30.

This application makes it possible to simplify the support device.

The trough is preferably made of copper and fitted, if necessary, with an inside circuit for liquid coolant flow.

What I claim is :

1. An apparatus for electric arc welding of two spaced plates forming a horizontal weld groove, said apparatus comprising beneath the weld groove a U-shaped trough extending from one plate to another and having lateral walls, a granular refractory material in the said trough, and resilient means acting from below for urging the said refractory material toward the weld while retained laterally by the lateral walls of said trough, wherein the said resilient means comprises elastic and compressible cushions interposed between the said granular material and respectively both lateral arms of the U-shaped trough and contacting elastically both plates along these arms, another elastic and compressible cushion being further interposed between and elastically compressed between the said granular material and the base of the said U-shaped trough.

2. An apparatus for electric arc welding of two spaced plates forming a horizontal weld groove, said apparatus,when in use in such welding,comprising:
   a. a thin strip of braided non-metallic fibers having a melting point approximately equal or higher than the melting point of the material of the weld, said strip extending beneath the weld groove, from contact with one plate to contact with the other one, in position to support and retain the material of the weld, while in the molten state, inside said weld groove;
   b. a granular refractory material underneath said strip and extending beneath the weld groove from beneath one plate to beneath the other, in position to retain said strip against both plates and under said weld groove;
   c. an open-topped U-shaped rigid trough extending across beneath said weld groove and said strip from beneath one plate to beneath the other plate and having lateral walls extending along but lower than said groove, said trough containing said granular material;
   d. resilient means acting from below for urging said refractory material up in the direction of the weld groove while said material is retained laterally by said lateral walls of said trough, whereby said refractory material is urged against said strip.

3. Apparatus of claim 2, in which said strip has a thickness between 1.5 and 6 millimeters.

4. Apparatus of claim 2, in which said strip is made of a silico aluminous substance.

5. Apparatus of claim 4, in which said strip is made of sillimanite.

* * * * *